Nov. 26, 1968 R. L. BRONNES ET AL 3,412,455

FUSION BONDING TO NON-METALS

Filed Aug. 13, 1963

INVENTORS.
ROBERT L. BRONNES
RAY C. HUGHES
RICHARD C. SWEET
BY Frank R. Trifari
AGENT.

United States Patent Office 3,412,455
Patented Nov. 26, 1968

3,412,455

FUSION BONDING TO NON-METALS

Robert L. Bronnes, Irvington, Ray C. Hughes, Ardsley, and Richard C. Sweet, North Tarrytown, N.Y., assignors to North American Philips Company, Inc., New York, N.Y., a corporation of Delaware Continuation-in-part of application Ser. No. 247,246, Dec. 26, 1962. This application Aug. 13, 1963, Ser. No. 301,866
2 Claims. (Cl. 29—472.7)

Our invention relates to a method of metallizing non-metals and in particular, to the application to non-metals of a firmly-bonded metallic layer which can be sealed or bonded to another metal. The invention specifically relates to the method of forming a metal surface on a body of non-metallic material, for example, a ceramic or vitreous material, for the purpose of forming a strong hermetic seal between the metal and non-metal.

This application is a continuation-in-part of our application Ser. No. 247,246, filed Dec. 26, 1962, now U.S. Patent No. 3,339,267.

In our earlier-filed application, we have disclosed hermetic seals between non-metals or between a non-metal and a metal, in which an adherent layer of a metal having a strong affinity for the non-metal is deposited thereover by cathodic sputtering, followed by covering the layer of active metal with a metal which prevents oxidation of the first layer and permits the application or solder thereto. More specifically, we have disclosed in that application that highly reactive metals such as tantalum, columbium, and to a lesser extent vanadium, zirconium and hafnium, all of which have a high energy of bond formation to electronegative elements such as oxygen, when cathodically sputtered onto a non-metallic substrate, form a tenaciously adherent layer on a non-metallic substrate, e.g. a ceramic body.

We have found, however, that such methods are best suited to substrates the material of which is very stable so that a strong chemical bond of the metallizing layer to the substrate could be formed. If the substrate is composed of a less stable material, these metals may be too active and may accordingly react so extensively with the substrate, with formation of compounds, so that the resulting layer may not adhere well. Further studies of the adhesion of a variety of metals to non-metallic compounds in which the bonding energy, and stability are moderate, instead of extremely high, has revealed that the most stable and firm bond between a metallizing layer and a non-metallic compound is secured when the metal of the metallizing layer is matched in reactivity to the reactivity of the metallic constituent of the non-metallic compound.

It is a principal object of the present invention to provide an improved method of metallizing non-metals in order to form hermetic seals between non-metals and between a non-metal and a metal.

A further object of our invention is to match the reactivity of the metal in the metallizing layer to that of the metallic constituent of the non-metallic compound.

A still further object of our invention is to improve the solderability and brazability of a metallized non-metallic substrate in order to form hermetic joints with another non-metal or a metal.

These and further objects of our invention will appear as the specification progresses.

In accordance with the present invention, we have found that, for best results, metals used to form a metallizing layer on a non-metal substrate, i.e. a compound of a metal and a non-metal, should have a free energy of reaction with the non-metallic constituent of the substrate not greatly exceeding, and permissably substantially less than, the free energy of formation of the substrate compound, both of the foregoing free energies being calculated on a common basis per gram-atomic weight of the non-metallic element, in order to avoid a too extensive reaction of the metallizing layer with the substrate.

In the preferred embodiment of our invention, we contemplate the joining to metals of compounds of a metal and a non-metal in which the free energy of formation of the compound is less than 100 kcal./gram-atom of the non-metallic constituent of the compound. As initial metallizing layers on such non-metals, we employ metals, therefore, which have a free energy of reaction with the non-metallic constituent of the compound of less than 100 kcal./gram-atom. Thus, in the metallizing and joining compositions containing the oxides of iron, manganese, nickel and zinc, and the sulfide of zinc, we prefer metals, or combinations of metals, including Mo, W, Mn, Fe, Co, Ni.

As in our earlier application, we have found it essential to cathodically sputter the metallizing layer onto the substrate to obtain firm adherence thereto.

Like in our earlier application, since the first applied layer is insoluble in solder, and is readily oxidizable, it must be protected against oxidation by a metal which is soluble in solder or a brazing metal, for which we prefer to use one of the platinum metals, or gold.

For reasons which are not fully understood, we obtain best results by applying, over the initial metallizing layer, a layer of platinum, or palladium metal, and then a layer of gold. This composite layer of platinum or palladium, plus gold, is readily wettable by tin-lead solder, requiring no flux, yet is not removed by prolonged exposure to molten solder.

The invention will be described in further detail with reference to the accompanying drawing in which.

Figure 1:
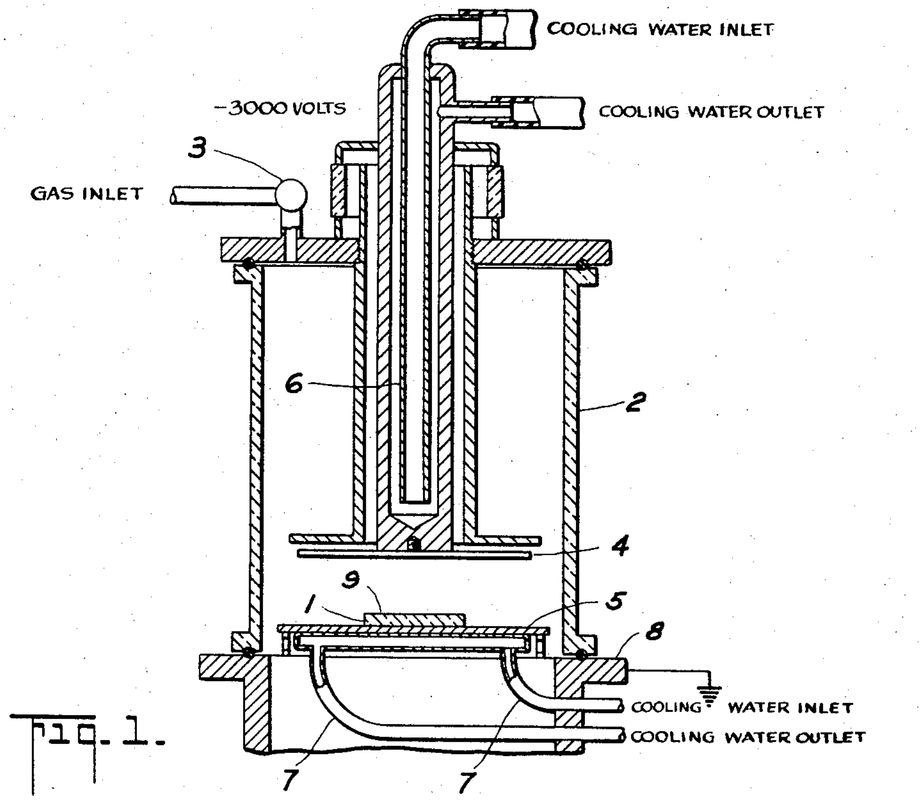
FIG. 1 shows an apparatus for carrying out the method according to the invention.

A body 1 of non-metallic material such as ZnS or a ferrite ($MO.Fe_2O_3$ in which M is one or more bivalent metals such as Ni, Mn, Zn, Mg, Cu, Co, etc.) is first subjected to a cleaning operation since it is essential that the surface of the body be physically and chemically clean. The cleaned body 1 is placed in a suitable chamber 2 which can be evacuated and filled with an inert gas through a valve 3 at a pressure of the order of 0.01–0.1 mm. mercury. Cathode and anode electrodes 4 and 5, respectively, have a potential applied therebetween at which an electrical discharge generally known as a glow discharge is established between the two electrodes, and a current flows. Under the action of this discharge and due to the bombardment of the cathode surface by energetic ions derived from the residual gas, the cathode 4, which consists of an iron-nickel-cobalt alloy of the composition known as Kovar, is gradually disintegrated and the metal deposited throughout the chamber. In order to avoid overheating the anode and cathode, water-cooling is supplied through ducts 6 and 7. The anode is connected to ground through base plate 8 of the vacuum apparatus and the cathode connected to the negative terminal of a power supply.

Practical conditions for cathodic sputtering of metals at substantial rates involve pressures of the order of 0.01–0.1 mm. of Hg, a potential of 500–4000 volts, cathode current densities of 0.1 to 1.0 ma./cm.$^2$, and an anode-cathode separation of 5 to 20 cm. such that the anode and surface to be coated are outside the cathode dark space. These values are representative, and are not absolute limits, however.

The sputtering rate of a given metal increases with increasing atomic weight of the gas atmosphere; therefore, for obtaining higher sputtering rates, employment of an atmosphere of high atomic weight is advantageous. Furthermore, in order that pure metals may be deposited, the sputtering atmosphere must be incapable of reacting with the metal. Since the employed metals can react with the more common gases, it is necessary to employ one of the rare gases. Due to considerations of atomic weight, cost, and availability, argon is most suitable, and is preferred. Krypton and xenon, still heavier, may be used, but due to their scarcity and high cost, are not generally used, while helium and neon are less advantageous due to their lower atomic weights.

In carrying out the process according to our invention, we have employed an anode-cathode separation of about 4 cms., with electrodes in the form of discs, within the range of 2½ to 3½ inches (6¼ to 8¾ cm.), argon pressure of 0.02 to 0.05 mm. and potential differences of 3000 to 4000 volts.

After the cleaned surface 9 is coated to a thickness of about 1000 A. or more with the bonding metal, e.g. a nickel-iron-cobalt alloy known as Kovar, the cathode is replaced with a cathode which consists, at least in part, of platinum, and a layer of this metal about 1000 A. in thickness is deposited over the bonding metal. After the layer of platinum is formed, the cathode is again replaced by one consisting at least in part of gold and a layer of that metal about 1000 A. is deposited over the metal.

After the surface of body 1 has been metallized, the body is removed from chamber 2 and can be joined, if desired, to a further metal member by soldering or brazing.

Figures 2, 3, 4:
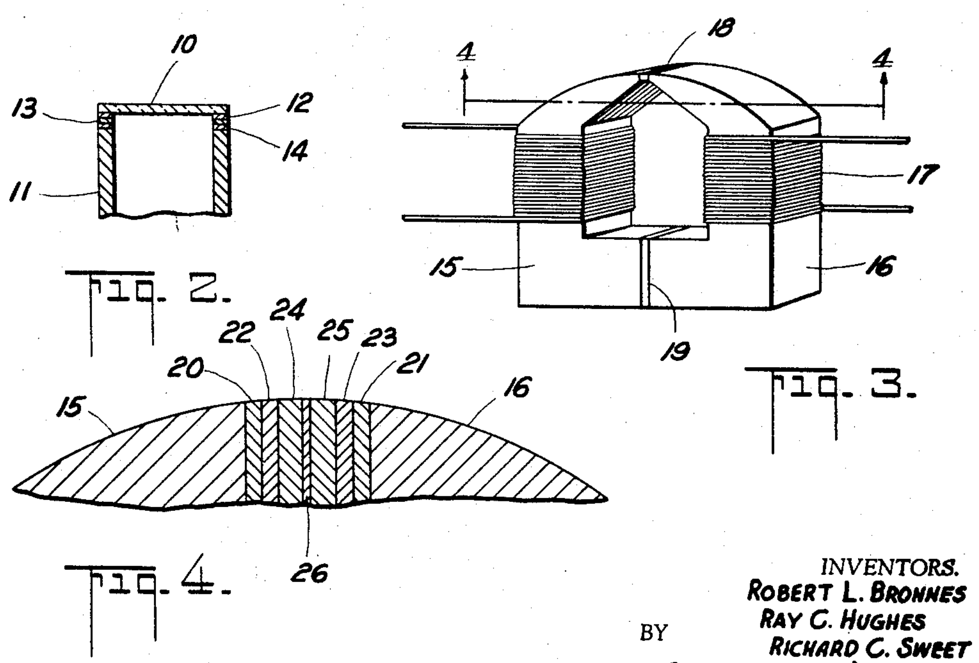
FIG. 2 shows a sectional view of a hermetically sealed ZnS window for an infra-red detector.
FIG. 3 shows a sectional view in elevation of a metal bonded ferrite recording head.
FIG. 4 shows a sectional view in elevation of the recording head along the lines IV—IV of FIG. 3.

As shown in FIG. 2, a wafer 10 of ZnS, permeable to infra-red radiation (which has been metallized around the rim) is joined by a tin-lead solder to a tubular metal support 11 to constitute a window for a detector of infra-red radiation. The metallized surface of the wafer has a thin layer 12 of iron-cobalt-nickel alloy firmly bonded to the ZnS wafer, probably by a metal to sulfur bond. Over this thin metal layer is a layer 13 of platinum metal which probably is interdiffused with the iron-cobalt-nickel alloy with the formation of an alloy containing platinum at the interface. However, attempts to solder to the platinum layer directly have been unsuccessful and have resulted in the platinum layer being stripped off. Hence, the platinum layer is covered with a layer 14 of gold which also probably forms an alloy with the platinum at metal interface. The composite gold-platinum layer is readily wettable by tin-lead solder requiring no flux, and is not removed by prolonged exposure to molten solder.

FIG. 3 shows a metal bonded ferrite recording head for recording and reproducing electrical oscillations on and from a magnetic recording track. Such a head is described in U.S. application Ser. No. 106,906 and comprises two portions 15 and 16 joined together by a metal bond leaving a gap 18, 19 between the two portions and a winding 17 to which an electrical signal may be applied or from which one may be derived as a magnetic carrier traverses the gap in close proximity thereto. Since each portion is constituted of the same material, e.g. a ferrite, a layer 20, 21 of bonding metal, e.g. Mo, Zo, Mn, Fe, Co, Ni and alloys thereof is first formed by cathodic sputtering on the bonding surface of each portion (see FIG. 4). Over the bonding metal, a layer 22, 23 of platinum metal has been applied, and over the latter metal, a layer 24, 25 of gold, both by cathodic sputtering. The gold surfaces are joined by a soldering metal 26, e.g., tin-lead solder. Alternatively, the two gold surfaces have been successfully joined together by the combined influence of pressure and heat, causing a welding together of the gold layers.

While we have described our invention in connection with specific examples and applications thereof, other modifications will be apparent to those skilled in this art without departing from the spirit and scope of the invention as defined in the appended claims.

What is claimed is:

1. A method of hermetically sealing a zinc-sulfide wafer to a metal body comprising the steps, applying to a clean surface portion of the wafer, by cathodic sputtering, a thin layer of an alloy of nickel, iron, and cobalt; applying over the alloy layer, by cathodic sputtering, a thin layer of platinum; applying over the platinum layer, by cathodic sputtering, a thin layer of gold; and soldering the so-coated wafer to the metal body.

2. A method of joining two ferrite bodies together comprising the steps, applying to cleaned surfaces of each of said bodies, by cathodic sputtering, a thin layer of a first metal selected from the group consisting of Mo, W, Mn, Fe, Co, Ni and alloys thereof; applying over the first metal layer, by cathodic sputtering, a thin layer of platinum; applying over the platinum layer, by cathodic sputtering, a thin gold layer; and thereafter fusion joining the gold layers.

References Cited

UNITED STATES PATENTS

| | | | |
|---|---|---|---|
| 2,305,758 | 12/1942 | Berghaus | 204—192 |
| 2,702,274 | 2/1955 | Law | 204—19 |
| 2,760,261 | 8/1956 | Pawlyk | 29—473.1 |
| 3,006,069 | 10/1961 | Rhoads | 29—473.1 |
| 2,939,207 | 6/1960 | Adler | 29—195 |
| 3,114,612 | 12/1963 | Friedrich | 29—195 |
| 3,107,756 | 10/1963 | Gallet | 29–473.1 |

FOREIGN PATENTS

| | | |
|---|---|---|
| 431,470 | 7/1935 | Great Britain. |
| 511,607 | 8/1939 | Great Britain. |

JOHN F. CAMPBELL, *Primary Examiner.*